United States Patent [19]

Knop

[11] 4,130,347
[45] Dec. 19, 1978

[54] FINE-LINE DIFFRACTIVE SUBTRACTIVE COLOR FILTERS

[75] Inventor: Karl Knop, Zurich, Switzerland

[73] Assignee: RCA Corporation, New York, N.Y.

[21] Appl. No.: 841,057

[22] Filed: Oct. 11, 1977

[30] Foreign Application Priority Data

Sep. 16, 1977 [GB] United Kingdom ............... 44394/77

[51] Int. Cl.² ............................................... G02B 5/18
[52] U.S. Cl. ............................ 350/162 R; 350/162 SF; 350/314
[58] Field of Search ............ 350/162 SF, 162 R, 314, 350/317, 311

[56] References Cited

U.S. PATENT DOCUMENTS

| | | | |
|---|---|---|---|
| 2,769,111 | 10/1956 | Sadowsky | 350/317 |
| 3,911,479 | 10/1975 | Sakurai | 350/162 SF |
| 3,957,354 | 5/1976 | Knop | 350/162 SF |
| 4,009,939 | 3/1977 | Okano | 350/162 SF |
| 4,057,326 | 11/1977 | Knop | 350/162 SF |
| 4,062,628 | 12/1977 | Gale | 350/314 |
| 4,082,453 | 4/1978 | Knop | 355/88 |

Primary Examiner—Ronald J. Stern
Attorney, Agent, or Firm—H. Christoffersen; Samuel Cohen; George J. Seligsohn

[57] ABSTRACT

Rectangular groove profile grating, having an effective line spacing no greater than 2μm, has grating parameters specified to provide at least acceptable or, preferably, good zero diffraction order color characteristics for subtractive primary colors and green when grating is illuminated with unpolarized white light.

40 Claims, 5 Drawing Figures

FINE-LINE DIFFRACTIVE SUBTRACTIVE COLOR FILTERS

This invention relates to diffractive-subtractive color filters comprising surface-relief diffraction gratings with rectangular groove profiles and, more particularly, to fine-line diffractive-subtractive color filters having those specified values of rectangular groove profile parameters that provide zero-diffraction-order color characteristics which are at least "acceptable" and are preferably "good" when illuminated with unpolarized white light.

Reference is made to my U.S. Pat. No. 3,957,354, which issued May 18, 1976, and to my U.S. patent application Ser. No. 694,441, filed June 9, 1976, now U.S. Pat. No. 4,057,326, both of which are assigned to the same assignee as the present invention. Both of these references are concerned with diffractive-subtractive color filters comprising surface-relief diffraction gratings with rectangular groove profiles.

In these references, the functional relationship between the zero-order-filter transfer function of the diffractive-subtractive color filter and the grating parameters is determined in accordance with simple diffraction theory (which is valid when the line spacing of the grating is substantially larger than any wavelength included within the spectrum of white light incident on the filter.) Simple diffraction theory, which goes back to Huygens (1629–1695) and Kirchhoff (1824–1887), neglects the vector character of light waves (no polarization) and assumes that an incident plane wave is altered by the grating only by shifting its phase locally in correspondence with the grating profile. Thus, this simple diffraction theory is an approximation which does not take into account that light is actually an electromagnetic wave. It has been found that so long as the effective grating line spacing is equal to or greater than $5\mu m$, any error introduced by this approximation is negligible for all visible wavelengths ($\lambda = 400-700nm$). The term "effective line spacing", as used herein, means that the index of refraction of the grating surroundings is either actually unity or is normalized to unity. However, as the effective grating line spacing is made smaller and smaller than $5\mu m$, the error introduced by the simple diffraction theory approximation becomes greater and greater at an increasing rate. Thus, for fine grating having effective line spacings of $2\mu m$ or less, the error becomes so large that simple diffraction theory must be abandoned in determining the zero-diffraction-order transfer function of such fine-line grating subtractive diffractive color filters. However, these fine-line diffraction gratings are advantageous because they provide sufficiently large diffraction angles to ensure that the subtracted higher-order diffracted light is deflected beyond the acceptance angle of the conventional optics used to project the zero-order light.

Therefore, the present invention avoids the use of simple diffraction theory in the design of the zero order transfer function of a diffractive subtractive color filter employing diffraction gratings with rectangular groove profiles that have effective line spacings of $2\mu m$ or less. Instead, the present invention employs rigorous diffraction theory to design such filters. Rigorous diffraction theory takes into account that light is an electromagnetic wave defined by the Maxwell-equations. In rigorous diffraction theory, the Maxwell-equations have to be solved respecting the exact boundary conditions at the surface of the surface-relief diffraction grating structure. This can be done generally only numerically and with the help of a computer. All grating parameters enter the calculations, and the result depends on all of them in a complicated fashion. The present invention, based on such computer-aided numerical solutions, specifies those particular values of grating parameters of groove profile surface-relief grating diffractive subtractive color filters having effective line spacings between $0.7\mu m$ and $2.0\mu m$ that provide at least acceptable zero-order color characteristics when illuminated with unpolarized white light.

In the Drawing:

FIG. 1 is a schematic diagram of a portion of a surface-relief transmissive diffraction grating with a rectangular groove profile;

FIG. 2 is a plot of effective grating line spacing over a range of 0.7 to $2.0\mu m$ against aspect ratio over a range from zero to 0.6, showing, in the accordance with the rigorous diffraction theory, the respective plot areas which are capable of providing good hues of green, magenta, yello and cyan zero-order light for a grating which has an appropriate value of optical amplitude and which is illuminated with unpolarized white light;

Figure 1:
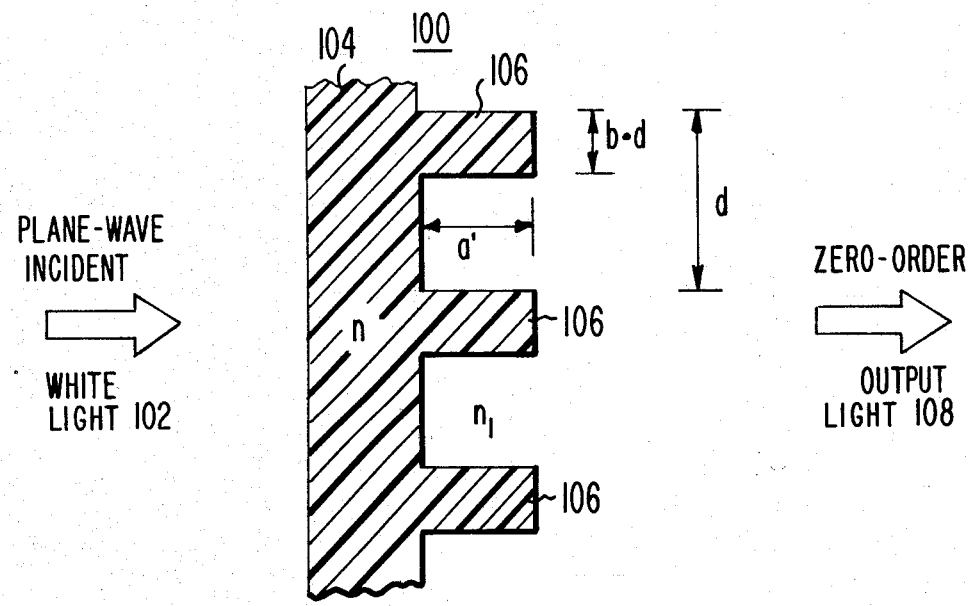

FIG. 1 schematically shows a surface-relief diffraction grating 100 having a rectangular groove profile, which is illuminated with a plane wave of incident white light 102. Grating 100 is composed of a material 104, such as an embossed sheet of polyvinyl choloride (PVC), having an index of refraction n (e.g. 1.5) different from $n_1$, that of its surroundings. (Usually the surroundings are air, having an index of refraction $n_1$ of unity, and the index of refraction n of material 104 is greater than unity. However, the surroundings need not be air nor have an index of refraction of unity). As shown in FIG. 1, the rectangular groove profile surface-relief diffraction grating 100 has an actual line spacing d, a physical depth a' and an aspect ratio (duty-cycle) b. The width of element 106 defining each line of grating 100 is equal to the product of the aspect ratio b times the line spacing d.

Grating 100 operates as a phase grating which deflects some portion of each wavelength component $\lambda$ of incident white light 102 into higher diffraction orders. The remaining portion of incident white light 102, after transmission through grating 100, emerges as undeflected zero-order output light 108.

As is known, the optical amplitude a of a transmissive phase grating, such as grating 100, is equal to the difference $\Delta n$ between the index of refraction n of material 104 and $n_1$ of its surroundings multiplied by the physical amplitude a' of the grating. When the surroundings are air, $n_1$ is equal to unity. In accordance with simplified diffraction theory, the proportion, of any wavelength component $\lambda$ of incident white light 102 which is transmitted into zero-order light 108, rather than being diffracted into higher orders, depends solely on the ratio of optical amplitude to wavelength (a/λ), as more fully described in my aforesaid U.S. Pat. No. 3,957,354. Thus, in accordance with simplified diffraction theory, the color hue of zero-order output light 108 obtained from a rectangular groove profile diffraction grating composed of predetermined material 104 (e.g. PVC) having a given ratio index of refraction $n/n_1$ (e.g. 1.5) with respect to its surroundings is determined solely by the value a of the optical amplitude of the grating. Further, in accordance with simplified diffraction theory, color saturation is a maximum when the value of b is equal to one-half and decreases symmetrically to zero as the value of b is either increased from one-half to unity or is decreased from one-half to zero. Also, in accordance with the simplified diffraction theory, the value of d is immaterial so long as it is sufficiently small to provide a diffraction angle great enough to prevent overlap of the higher-diffraction-order light with zero-order output light 108 in the aperture of the viewing optics, as is more fully described in the aforesaid U.S. Pat. No. 3,957,354.

In the case of rigorous diffraction theory, where the Maxwell-equations have to be solved respecting the exact boundary conditions at the surface of diffraction grating 100, the color hue of zero-order output light 108 depends on all of the grating parameters n, $n_1$, a', b and d in a complicated fashion. Further, in accordance with rigorous diffraction theory, even when all these grating parameters have certain specified values, the color hue of zero-order output light 108 derived from white light 102 which is polarized with its electric vector parallel to the grating lines is different from the color hue of zero-order output light 108 derived from white light 102 which is polarized with its electric vector perpendicular to the grating lines. This is true because the zero-order transmission characteristics, as a function of light wavelength, of any diffractive-subtractive color filter having an effective line spacing of 2μm or less is quite different for each of these two orthogonal polarizations of incident white light 102. In practical applications, as in the reproduction of color pictures, unpolarized light is nearly always used. The zero-order output transmission characteristics as a function of wavelength for a diffraction grating illuminated with unpolarized light is obtained by simply taking the average of the respective transmission characteristics for the parallel and perpendicular types of polarized light. Each of the plots shown in FIGS. 2, 3, 4 and 5 is derived on the assumption that incident white light 102 is unpolarized.

In order to provide a solution of the diffraction problem in accordance with rigorous diffraction theory, a computer is programmed to solve the Maxwell-equations in accordance with each of a range of different assumed boundary conditions at the surface of a transmissive phase-grating structure, which is assumed to be made of material having a specified difference Δn of index to refractions with respect to its surroundings (e.g. n = 1.5; $n_1$ = 1). The assumed boundary conditions include different values of the ratio d/λ, different values of the ratio a'/λ and different values of the aspect ratio b. The Maxwell-equations are solved for each set of different assumed values of these parameters both for the case where parallel polarization is assumed and for the case where perpendicular polarization is assumed, and the average of these two polarization solutions is derived. In this manner, the zero-order transmission characteristics over the visible spectrum for unpolarized light of any such rectangular groove profile diffraction grating, as a function of the grating parameters thereof, can be calculated in accordance with rigorous diffraction theory to provide any certain subtractive color.

My aforesaid U.S. Pat. No. 3,957,354 brings out the fact that a full gamut of colors may be achieved with a set of only three diffractive-subtractive color filters, each of which colorimetrically corresponds with a separate one of the three subtractive primary colors magenta, yellow and cyan. My aforesaid U.S. Pat. No. 4,057,326 shows that it also may be desirable to employ a fourth subtractive color filter colorimetrically corresponding to green, in addition to the respective three subtractive primary color filters.

Aiming for an optimum set of grating parameters, which produce the best magenta, yellow, cyan and green in zero-order diffraction, extensive computer calculations were made for both parallel polarization and perpendicular polarization, with n being made equal to 1.5 and $n_1$ being made equal to one, to provide a Δn of 0.5. The remaining grating parameters were varied within the following ranges:

$$b = 0.1 \ldots 0.9$$

$$d/\lambda = 0.7 \ldots 5.0$$

$$a'/\lambda = 1 \ldots 7.0$$

From the data thus obtained, spectra over the visible range of wavelengths (λ = 400–700nm) were deduced for gratings surrounded by air with a line spacing d between 0.5μm and 2μm and a physical depth a' between 0.7μm and 2.8μm. The spacing between individual parameter values was chosen small enough to allow for interpolation.

It is well known from the laws of optics, that the same data apply to the case where $n_1 \neq 1$ (i.e. the surroundings are not air) as long as $n/n_1$ = 1.5. FIGS. 2 to 5 are then correctly understood by replacing the quantities n, d, a', when the surroundings are air, by $n/n_1$, $dn_1$, $a'n_1$, to cover the general case when the surroundings are not air. Furthermore, it was found by computation that the requirement $n/n_1$ = 1.5 is not too stringent. FIGS. 2 to 5 can be used in practice for any value in the range 1.3 < $n/n_1$ < 1.7 with an acceptable loss in accuracy. In a subtractive color scheme, based on the three fixed primary colors cyan, magenta and yellow (with the possible addition of green), it is not only important that the colors have the correct hue, but also that they are bright and show low minimums to yield good mixed colors and dark black. In other words, not only the positions of the maxima and minima in the transmission characteristics are of importance, but also their magnitudes.

Therefore, it has been postulated that for an "optimum" primary color the maxima in the transmittance curve for unpolarized light should exceed 80 percent at the required wavelength, and that the minima should be below 5 percent. For instance, for an optimum magenta (minus green), a minimum below 5 percent around 520nm (green) and two maxima above 80 percent at both ends of the visible spectrum are required. From such an assumption, the range of optimum grating parameters for unpolarized white illuminating light have been determined in accordance with rigorous diffraction theory, by taking the average of the data computed respectively for parallel polarization and perpendicular polarization.

Figure 2:
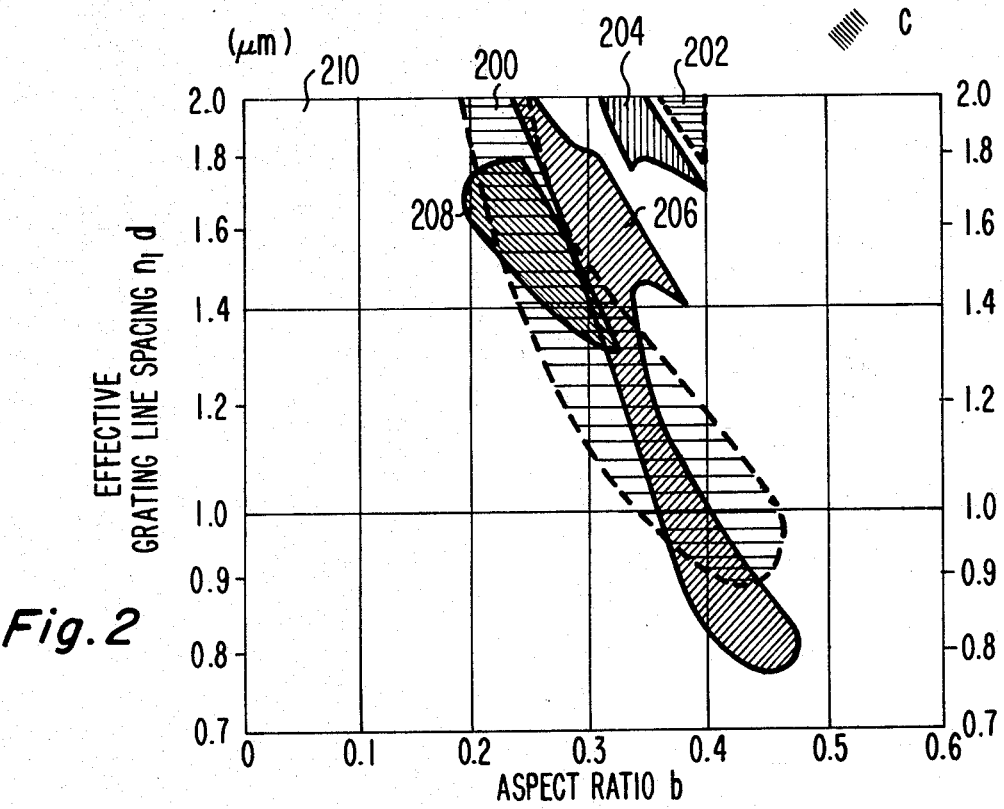

The result, shown in FIG. 2, consists of the plot areas in the $n_1d$ (effective line-spacing) -b (aspect ratio) plane that provide "optimum" colors. Only within the $n_1d$ and b values within these plot areas can the above criteria be fulfilled for the corresponding color by an appropriate adjustment of the grating depth $n_1a'$. Thus, only if the respective values of $n_1d$ and b define a point within plot area 200 or plot area 202 is it possible to find some depth $n_1a'$ which provides an "optimum" green. Therefore, outside of plot areas 200 and 202 it is not possible to provide "optimum" green zero-diffraction output light from a fine-line diffraction grating (effective line-spacing $n_1d$ no greater than 2μm) which is illuminated with unpolarized white light, at any possible depth of grating. Similarly, an "optimum" magenta may be obtained only within plot area 204; and "optimum" yellow may be obtained only within a plot area 206, and an "optimum" cyan may be obtained only within plot area 208 of FIG. 2. As indicated in FIG. 2, no "optimum" color at all can be found for such fine-line gratings when the aspect ratio b is below about 0.19 or above about 0.47. Similarly no "optimum" colors can be obtained when $n_1d$ is below about 0.75. The results shown in FIG. 2 have been confirmed by experiment. These results differ from those obtained with simplified diffraction theory the latter predicts that "optimum" colors of any value of d may be obtained for values of b between 0.39 and 0.61 and this is simply incorrect for fine-line gratings.

Figure 3:
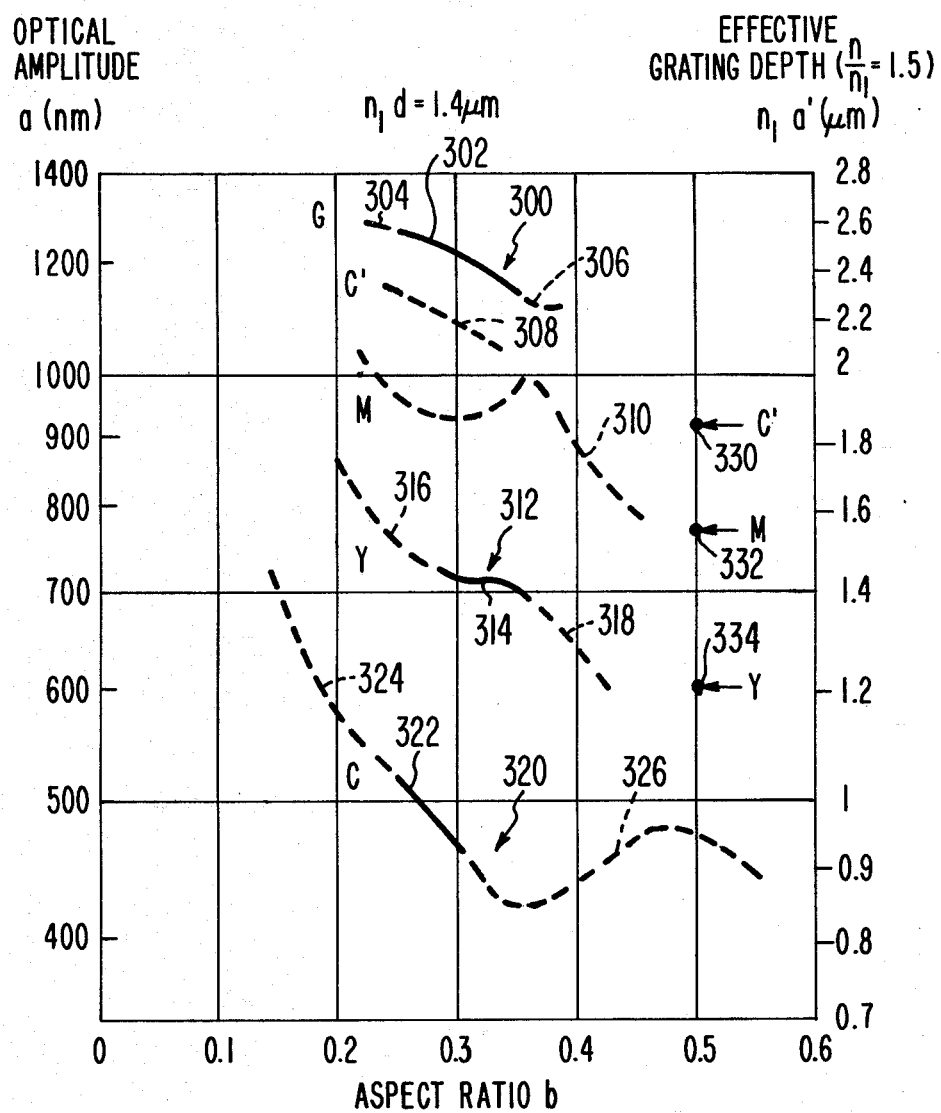
FIG. 3 is a plot of optical amplitude values over a range between 350 to 1400nm, approximately, against aspect ratio over a range from 0 to 0.6, showing the respective plot points which provide color hues for green, magenta, yellow and cyan zero-order light, for the case where the effective grating line spacing is $1.4\mu m$.
Figure 4:
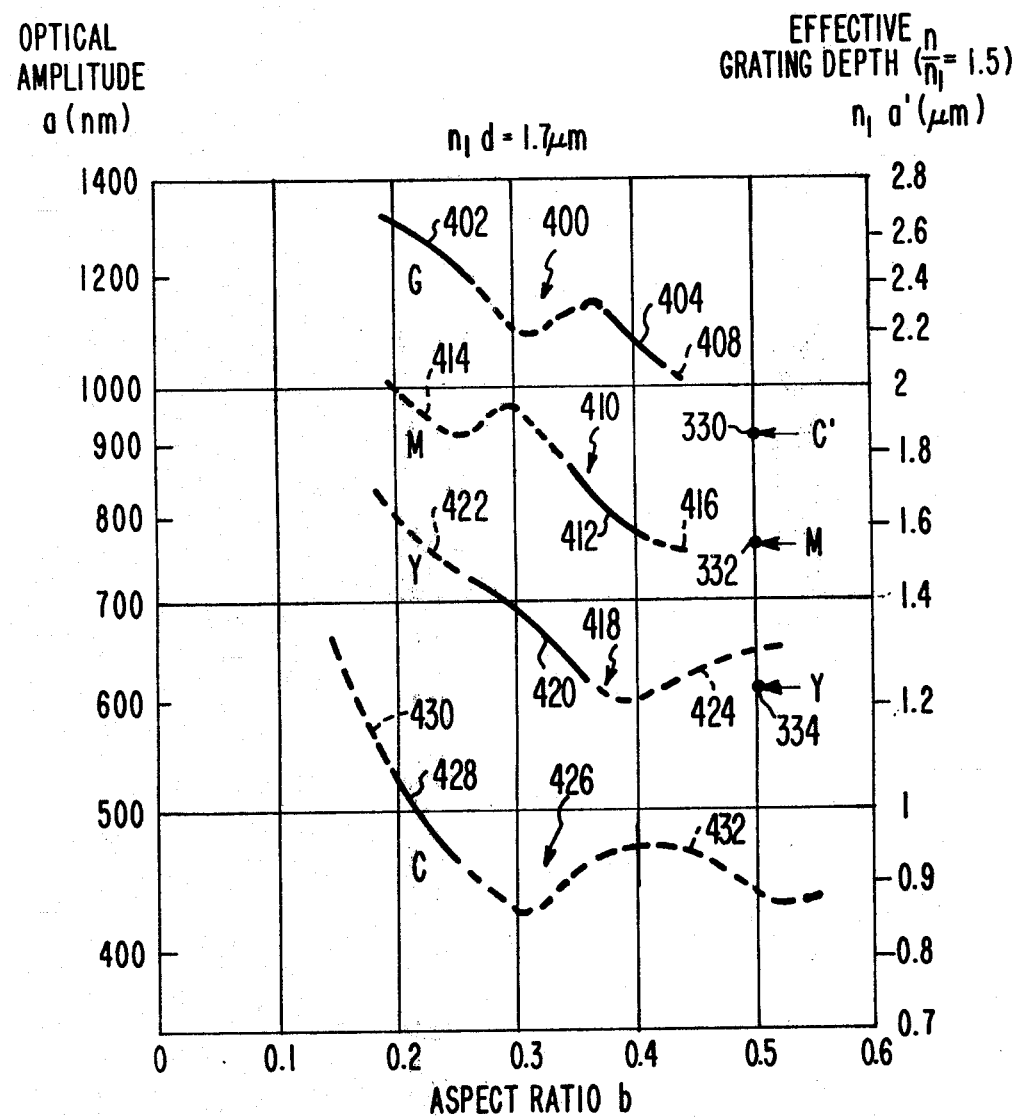
FIG. 4 is a similar plot to that of FIG. 3, for the case where the effective grating line spacing is $1.7\mu m$ and, FIG. 5 is a similar plot to that of FIG. 3 for the case where the effective grating line spacing is $2.0\mu m$.
Figure 5:
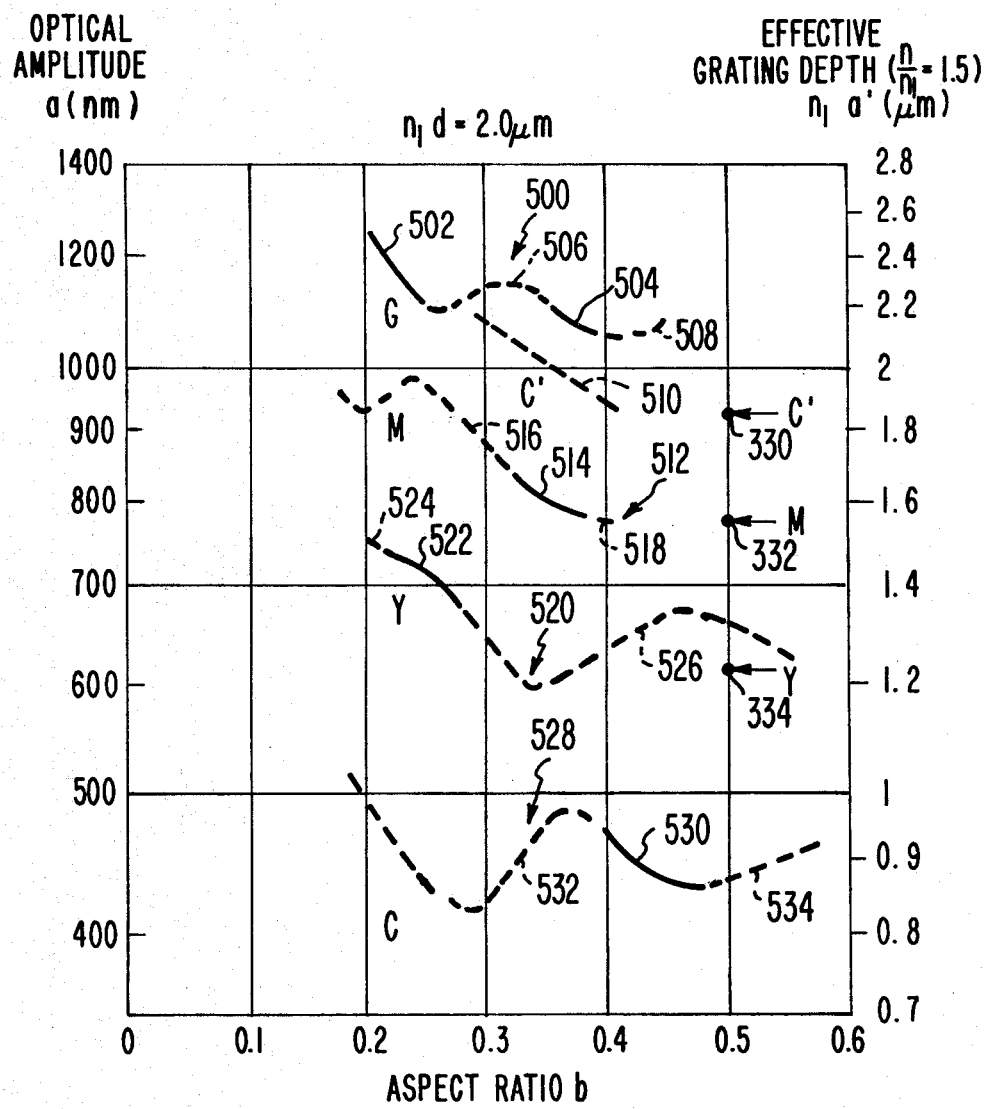

As shown in FIGS. 3, 4 and 5, for each of the colors magenta, yellow and green, there is a corresponding single range of optical amplitude a, (a equals $an$ times the physical depth $a'$). However, in the case of cyan, for most values of effective line-spacing $n_1d$, there are two separate and distinct ranges of optical amplitude a that provide the color cyan. The first of these (designated C in FIGS. 3, 4 and 5) appears at an optical amplitude a (or effective grating depth $n_1a'$) which is somewhat smaller than that for yellow. The second of these (designated C' in FIGS. 3 and 5) has an optical amplitude a (or an effective grating depth $n_1a'$) which is somewhat greater than that for magenta. For coarse gratings (the type described in the aforesaid U.S. Pat. No. 3,957,354 and U.S. Pat. No. 4,057,326, C' cyan is always preferred because it is more saturated. However, for fine-line gratings (the type described herein), cyan C is always colorimetrically superior. In addition, cyan C, because of its smaller depth, is easier to accurately control in practice.

As described in the aforesaid U.S. Pat. No. 4,057,326, a single grating is so used to produce cyan, yellow and green by varying its amplitude. For fine-line gratings, whose $n_1d$ — b values are specified by the plot areas of FIGS. 2, such a single grating requires respective values of $n_1d$ and b where all three colors, cyan, yellow and green are simultaneously "optimum." This requirement can be met in a region in which $n_1d$ has a value between 1.3 and 1.8μm and b has a value in the vicinity of 0.3. Ideally, for coarse gratings, the green amplitude should be exactly equal to the sum of the cyan amplitude and the yellow amplitude. In the case of the fine-line gratings, the physical amplitude for green is close but not exactly, equal to the sum of the cyan physical amplitude and the yellow physical amplitude. However, colorimetrically good cyan, yellow and green hues are nevertheless obtained.

In FIG. 2, only the two parameters $n_1d$ and b are varied, and it is assumed that the effective grating depth $n_1a'$ is adjusted to provide the proper optical amplitude for a desired color. In the respective FIGS. 3, 4 and 5, the relationship between optical amplitude a (effective grating depth $n_1a'$) and aspect ratio b for each of the desired colors is considered for the respective values of effective line-spacing $n_1d$ of 1.4μm, 1.7μm and 2.0μm. Specifically, FIG. 3, which is directed to a grating having an effective line spacing $n_1d$ equal to 1.4μm, shows optical amplitude a (effective depth $n_1a'$) plotted against aspect ratio b to provide green (G) plot line 300, cyan (C') plot line 308, magenta (M) plot line 310, yellow (Y) plot line 312 and cyan (C) plot line 320. Also shown in FIGS. 3, 4 and 5 are respective points 330, 332 and 334 which designate the respective optical amplitudes a (effective depth $n_1a'$), at a 50 percent aspect ratio b at which simplified diffraction theory predicts the most saturated subtractive primary colors cyan C', magenta M and yello Y should occur.

In FIG. 4, which covers the case where the effective line spacing $n_1d$ is 1.7μm, plot lines 400, 410, 418 and 426 correspond respectively to plot lines 300, 310, 312 and 320 of FIG. 3. Similarly, in FIG. 5, which covers the case where the effective line spacing $n_1d$ is 2.0μm, plot lines 500, 510, 520 and 528 correspond respectively to plot lines 300, 308, 310, 312 and 320 of FIG. 3.

As is known in the art of colorimetery, a given color, such as cyan, magenta, yellow or green, is not manifested by only a single unique hue. Rather, a given color is manifested by any hue within a given band of hues. Thus, there are various hues, each being slightly different from each other, but all of which manifest the color cyan. In a similar way, this is true for magenta, yellow and green. Therefore, the colorimetic criteria for the plot lines in FIGS. 3, 4 and 5 is not as precise as the criteria discussed above for the plot areas of FIG. 2. Each of the plot lines of FIGS. 3, 4 and 5 actually represents the center line, or mean, of a narrow band which extends slightly above and slightly below the plot line itself.

Besides the colorimetric characteristics of color hue, there are the colorimetric characteristics of color saturation and brightness. The saturation of fine-line gratings tends to be below that predicted for coarse gratings by simplified diffraction theory, i.e., for points 330, 332 and 334, respectively. The specific optical amplitudes of each of points 330, 332 and 334 have been chosen to be in close agreement with a standard for printing dyes (European Standard C.E.I. 13: 6/7/67). Due to the quantitative imprecision with which satisfactory colorimetric characteristics can be designated, the line-plots in FIGS. 3, 4 and 5 have been divided into "good" color characteristics (solid-line portions) and merely "acceptable" color characteristics (dashed-line portions). In the case of the color yellow (Y), magenta (M) and green (G), the color is somewhat arbitrarily considered to be "good" if the saturation is 90 percent or better of the above set for standard colors of coarse gratings and their brightness is at least 60 percent of that theoretically realizable with coarse gratings. In the case of cyan (C) the color is considered to be "good" if its saturation is 80 percent or better and its brightness is 60 percent or better of that achieved theoretically with coarse gratings. These "good" colors are obtained in FIG. 3 only in solid-line portions 302, 314 and 322; in FIG. 4 they are obtained only in solid-line portions 402, 404, 412, 420 and 428, and in FIG. 5 they are obtained only in solid-line portions of 502, 504, 514, 522 and 530.

Saturation and brightness characteristics which are below the "good" category, but are at least 80 percent thereof, are considered to be "acceptable". Thus, in FIG. 3, dashed-line portions 304 and 306 of plot-line 300, dashed-line portions 316 and 318 of plot-line 312 and dashed-line portions 324 and 326 of plot line 320 are only in this "acceptable", rather than "good", category. In FIG. 4, dashed-line portions 406 and 408 of plot line 400, dashed-line portions 414 and 416 of plot-line 410, dashed-line portions 422 and 424 of plot-line 418, and dashed line 430 and 432 of plot-line 426 are only within the "acceptable" rather than the "good" category. In FIG. 5, dashed-line portions 506 and 508 of plot-line 500, dashed-line portions 516 and 518 of plot-line 512, dashed-line portion 526 of plot-line 520 and dashed-line portions 532 and 534 of plot-line 528 are also only within this "acceptable," rather than "good" category. In FIG. 5, plot-line 510 is entirely only within the "acceptable" rather than the "good" category. Although the criteria for "good" and "acceptable" are somewhat arbitrary they are still very helpful in the selection of appropriate subtractive primary colors, as well as an appropriate green color for use in a grating of the type disclosed in my aforesaid U.S. Pat. No. 4,057,326.

In this regard, the following three tables illustrate alternative selections of the three subtractive primary colors and, in the case of tables 1 and 3, also green:

TABLE 1

|  | $n_1 d [\mu m]$ | b | a [nm] |
|---|---|---|---|
| Cyan (C) | 1.4 | 0.325 | 430 |
| Magenta | 1.7 | 0.325 | 905 |
| Yellow | 1.4 | 0.325 | 710 |
| Green | 1.4 | 0.325 | 1180 |

TABLE 2

|  | $n_1 d [\mu m]$ | b | a [nm] |
|---|---|---|---|
| Cyan | 1.4 | 0.25 | 520 |
| Yellow | 1.4 | 0.35 | 700 |
| Magenta | 1.7 | 0.35 | 870 |

TABLE 3

|  | $n_1 d [\mu m]$ | b | a [nm] |
|---|---|---|---|
| Cyan | 1.4 | 0.3 | 460 |
| Yellow | 1.4 | 0.3 | 710 |
| Green | 1.4 | 0.3 | 1200 |
| Magenta | 1.7 | 0.35 | 870 |

What is claimed is:

1. In a fine-line rectangular-profile diffractive subtractive filter surrounded by a medium having an index of refraction $n_1$ and responsive to the illumination thereof with unpolarized white light for deriving zero diffraction order output light exhibiting a single one of the group of colors consisting of cyan, magenta, yellow and green, wherein said filter has a given line spacing d and said rectangular-profile has a given aspect ratio b and a given optical depth a; the improvement:
wherein the respective values of $n_1 d$ and b define a point within a certain one of plot areas 200, 202, 204, 206 and 208 of FIG. 2.

2. The filter defined in claim 2, wherein said single one of the colors is green, and wherein the respective values of $n_1 d$ and b define a point within a certain one of plot areas 200 and 202 of FIG. 2.

3. The filter defined in claim 2, wherein the value $n_1 d$ is substantially 1.4μm and wherein the respective values of a and b define a point substantially on plot-line 300 of FIG. 3.

4. The filter defined in claim 3, wherein the respective values of a and b define a point substantially on solid portion 302 of plot-line 300 of FIG. 3.

5. The filter defined in claim 2, wherein the value of $n_1 d$ is substantially 1.4μm and wherein a and b are substantially 1200nm and 0.3 in value.

6. The filter defined in claim 2, wherein the value of $n_1 d$ is substantially 1.4μm and wherein a and b are substantially 1180nm and 0.325 in value.

7. The filter defined in claim 2, wherein the value $n_1 d$ is substantially 1.7μm and wherein the respective values of a and b define a point substantially on plot-line 400 of FIG. 4.

8. The filter defined in claim 7, wherein the respective values of a and b define a point substantially on a certain one of solid portions 402 and 404 of plot-line 400 of FIG. 4.

9. The filter defined in claim 2, wherein the value of $n_1 d$ is substantially 2.0μm and wherein the respective values of a and b define a point substantially on plot-line 500 of FIG. 5.

10. The filter defined in claim 9, wherein the respective values of a and b define a point substantially on a certain one of solid portions 502 and 504 of plot-line 500 of FIG. 5.

11. The filter defined in claim 1, wherein said single one of the colors is magenta and wherein the respective values of $n_1 d$ and b define a point within plot area 204 of FIG. 2.

12. The filter defined in claim 11, wherein the value of $n_1 d$ is substantially 1.4μm and wherein the respective value of a and b define a point substantailly on plot-line 310 of FIG. 3.

13. The filter defined in claim 11, wherein the value of $n_1 d$ is substantially 1.7μm and wherein the respective values of a and b define a point substantially on plot-line 410 of FIG. 4.

14. The filter defined in claim 13, wherein the respective values of a and b define a point substantially on solid portion 412 of plot-line 410 of FIG. 4.

15. The filter defined in claim 11, wherein the value of $n_1 d$ is substantially 1.7μm and wherein a and b are substantially 870nm and 0.35 in value.

16. The filter defined in claim 11, wherein the value of $n_1 d$ is substantially 1.7μm and wherein a and b are substantially 905 and 0.325 in value.

17. The filter defined in claim 11, wherein the value of $n_1 d$ is substantially 2.0μm and wherein the respective values of a and b define a point substantially on plot-line 512 of FIG. 5.

18. The filter defined in claim 17, wherein the respective values of a and b define a point substantianlly on solid portion 514 of plot-line 512 of FIG. 5.

19. The filter defined in claim 1, wherein said single one of the colors is yellow, and wherein the respective values of $n_1 d$ and b define a point within plot area 206 of FIG. 2.

20. The filter defined in claim 19, wherein the value of $n_1 d$ is substantially 1.4μm and wherein the respective values of a and b define a point substantially on plot-line 312 of FIG. 3.

21. The filter defined in claim 20, wherein the respective values of a and b define a point substantially on solid portion 314 of plot-line 312 of FIG. 3.

22. The filter defined in claim 19, wherein the value of $n_1d$ is substantially 1.4 and wherein a and b are substantially 700nm and 0.35 in value.

23. The filter defined in claim 19, wherein the value of $n_1d$ is substantially 1.4μm and wherein a and b are substantially 710nm and 0.325 in value.

24. The filter defined in claim 19, wherein the value of $n_1d$ is substantially 1.4μm and wherein a and b are substantially 710nm and 0.3 in value.

25. The filter defined in claim 19, wherein the value of $n_1d$ is substantially 1.7μm and wherein the respective values of a and b define a point substantially on plot-line 418 of FIG. 4.

26. The filter defined in claim 25, wherein the respective values of a and b defined a point substantially on solid portion 420 of plot-line 418 of FIG. 4.

27. The filter defined in claim 19, wherein the value of $n_1d$ is substantially 2.0μm and wherein the values of a and b define a point substantially on plot-line 520 of FIG. 5.

28. The filter defined in claim 27, wherein the respective values of a and b define a point substantially on solid portion 522 of plot-line 520 of FIG. 5.

29. The filter defined in claim 1, wherein said single one of the colors is cyan, and wherein the respective values of a and b define a point within plot area 208 of FIG. 2.

30. The filter defined in claim 29, wherein the value of $n_1d$ is substantially 1.4μm and wherein the respective values of a and b define a point substantially on a certain one of plot-lines 308 and 312 of FIG. 3.

31. The filter defined in claim 30, wherein the respective values of a and b define a point substantially solid portion 322 of plot-line 320 of FIG. 3.

32. The filter defined in claim 29, wherein the value of $n_1d$ is substantially 1.4μm and wherein a and b are substantially 520nm and 0.25 in value.

33. The filter defined in claim 29, wherein the value of $n_1d$ is substantially 1.4μm and wherein a and b are substantially 460nm and 0.3 in value.

34. The filter defined in claim 29, wherein the value of $n_1d$ is substantially 1.4μm and wherein a and b are substantially 430nm and 0.325 in value.

35. The filter defined in claim 29, wherein the value of $n_1d$ is substantially 1.7μm and wherein the respective values of a and b define a point substantially on plot-line 426 of FIG. 4.

36. The filter defined in claim 35, wherein the respective values of a and b define a point substantially on solid portion 428 of plot-line 426 of FIG. 4.

37. The filter defined in claim 29, wherein the value of $n_1d$ is substantially 2.0μm and wherein the respective values of a and b defined a point substantially on a certain one of plot-lines 510 and 528 of FIG. 5.

38. The filter defined in claim 37, wherein the respective values of a and b define a point substantially on solid portion 530 of plot-lines 528 of FIG. 5.

39. In a fine-line rectangular-profile diffraction subtractive filter surrounded by a medium having an index of refraction $n_1$ and responsive to the illumination thereof with unpolarized white light for deriving zero diffraction order output light; the improvement:

wherein said filter over a first region thereof has a line spacing multiplied by $n_1$ of substantially 1.4μm, an aspect ratio of substantially 0.3 and an optical amplitude of substantially 460nm, whereby said output light from said first region exhibits a cyan color, wherein said filter over a second region thereof has a line spacing multiplied by $n_1$ of substantially 1.4μm, an aspect ratio of substantially 0.3 and an optical amplitude of substantially 710nm, whereby said output light from said second region exhibits a yellow color and wherein said filter over a third region thereof has a line spacing of multiplied by $n_1$ of substantially 1.4μm, an aspect ratio of substantially 0.3 and an optical amplitude of substantially 1200nm whereby said output light from said third region exhibits a green color.

40. In a fine-line rectangular-profile diffraction subtractive filter surrounded by a medium having an index of refraction $n_1$ and responsive to the illumination thereof with unpolarized white light for deriving zero diffraction order output light; the improvement:

wherein said filter over a first region thereof has a line spacing multiplied by $n_1$ of substantially 1.4μm, an aspect ratio of substantially 0.325 and an optical amplitude of substantially 430nm, whereby said output light from said first region exhibits a cyan color, wherein said filter over a second region thereof has a line spacing multiplied by $n_1$ of substantially 1.4μm, an aspect ratio of substantially 0.325 and an optical amplitude of substantially 710nm whereby said output light from said second region exhibits a yellow color, and wherein said filter over a third region thereof has a line spacing multiplied by $n_1$ of substantially 1.4μm, an aspect rationof substantially 0.325 and an optical amplitude of substantially 1180 whereby said output light from said third region exhibits a green color.

* * * * *

UNITED STATES PATENT AND TRADEMARK OFFICE
CERTIFICATE OF CORRECTION

PATENT NO. : 4,130,347

DATED : December 19, 1978

INVENTOR(S) : Karl Knop

Page 1 of 3

It is certified that error appears in the above-identified patent and that said Letters Patent is hereby corrected as shown below:

Cover page under heading of Foreign Application Priority Data should read -- Oct. 26, 1976 United Kingdom-----44394/76 --.

Column 2, line 59, "amplitude a" should read ---amplitude $\underline{a}$---.
Column 3, line 9, "a" should read ---$\underline{a}$---.
Column 5, line 32, "amplitude a" should read ---amplitude $\underline{a}$---.
Column 5, line 32, "(a equals" should read ---($\underline{a}$ equals---.
Column 5, line 32, "$\alpha$" should read ---$\Delta$---.
Column 5, line 35, "a" should read ---$\underline{a}$---.
Column 5, line 37, "a" should read ---$\underline{a}$---.
Column 5, line 40, "a" should read ---$\underline{a}$---.
Column 6, line 3, "a '" should read ---$\underline{a}$---.
Column 6, line 9, "a" should read ---$\underline{a}$---.
Column 6, line 14, "a" should read ---$\underline{a}$---.
Column 6, line 24, after "510" insert ---512---.
Column 7, line 30, Table 1, "a" should read ---$\underline{a}$---.
Column 7, Table 2, "a" should read ---$\underline{a}$---.
Column 7, Table 3, "a" should read ---$\underline{a}$---.
Column 7, line 59, "a" should read ---$\underline{a}$---.
Column 7, line 63, "claim 2" should read ---claim 1---.
Column 8, line 1, "a" should read ---$\underline{a}$---.
Column 8, line 4, "a" should read ---$\underline{a}$---.
Column 8, line 7, "a" should read ---$\underline{a}$---.
Column 8, line 10, "a" should read ---$\underline{a}$---.
Column 8, line 14, "a" should read ---$\underline{a}$---.
Column 8, line 17, "a" should read ---$\underline{a}$---.
Column 8, line 22, "a" should read ---$\underline{a}$---.
Column 8, line 25, "a" should read ---$\underline{a}$---.
Column 8, line 35, "a" should read ---$\underline{a}$---.

UNITED STATES PATENT AND TRADEMARK OFFICE
CERTIFICATE OF CORRECTION

PATENT NO. : 4,130,347

DATED : December 19, 1978

INVENTOR(S) : Karl Knop

It is certified that error appears in the above-identified patent and that said Letters Patent is hereby corrected as shown below:

```
Column 8, line 39, "a" should read ---a̲---.
Column 8, line 42, "a" should read ---a̲---.
Column 8, line 45, "a" should read ---a̲---.
Column 8, line 48, "a" should read ---a̲---.
Column 8, line 52, "a" should read ---a̲---.
Column 8, line 55, "a" should read ---a̲---.
Column 8, line 64, "a" should read ---a̲---.
Column 8, line 67, "a" should read ---a̲---.
Column 9, line 2,  "a" should read ---a̲---.
Column 9, line 5,  "a" should read ---a̲---.
Column 9, line 8,  "a" should read ---a̲---.
Column 9, line 12, "a" should read ---a̲---.
Column 9, line 15, "a" should read ---a̲---.
Column 9, line 19, "a" should read ---a̲---.
Column 9, line 22, "a" should read ---a̲---.
Column 9, line 26, "a"' should read ---a̲---.
```

UNITED STATES PATENT AND TRADEMARK OFFICE
CERTIFICATE OF CORRECTION

PATENT NO. : 4,130,347

DATED : December 19, 1978

INVENTOR(S) : Karl Knop

It is certified that error appears in the above-identified patent and that said Letters Patent is hereby corrected as shown below:

```
Column 9,  line 30,  "a" should read ---a̲---.
Column 9,  line 33,  "a" should read ---a̲---.
Column 9,  line 36,  "a" should read ---a̲---.
Column 9,  line 39,  "a" should read ---a̲---.
Column 9,  line 42,  "a" should read ---a̲---.
Column 9,  line 46,  "a" should read ---a̲---.
Column 9,  line 49,  "a" should read ---a̲---.
Column 10, line 1,   "a" should read ---a̲---.
Column 10, line 4,   "a" should read ---a̲---.
```

Signed and Sealed this

Twenty-fourth Day of April 1979

[SEAL]

Attest:

RUTH C. MASON
Attesting Officer

DONALD W. BANNER
Commissioner of Patents and Trademarks